D. B. WHEELER.
BLANK FOR NEGOTIABLE BANKING INSTRUMENTS.
APPLICATION FILED AUG. 9, 1916.

1,225,543.

Patented May 8, 1917.
2 SHEETS—SHEET 1.

FIG. 1.

No. 102.

WHEELER INDUSTRIAL BANKING AND CREDIT ASSOCIATION.
Certificate of Deposit and Withdrawal Order.

Received of _____ has deposited $ (____)

Certificate of Deposit issued by

Bearing interest of 1¢ every 4 months on a $1 certificate. 1¢ every 2 months on a $2 certificate. 1¢ every month on a $4 certificate. And same rate of interest on every multiple thereof.

For (____)                                    Per _____

Dated _____

Signed _____

To be credited to the account of the General fund of the Wheeler Industrial Banking and Credit Association. Subject to withdrawal when order on reverse side is signed by the President of the Association and Depositor.

Pres. W. I. B. & C. Ass'n.

FIG. 2.

| Monthly Interest | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | Cents |
|---|---|---|---|---|---|---|---|---|---|---|---|---|---|---|---|---|---|---|---|---|---|---|---|---|---|---|
| On | 4 | 8 | 12 | 16 | 20 | 24 | 28 | 32 | 36 | 40 | 44 | 48 | 52 | 56 | 60 | 64 | 68 | 72 | 76 | 80 | 84 | 88 | 92 | 96 | 100 | $ |

B—
C—

Pay to the order of _____ and charge to the general fund of Wheeler Industrial Banking and Credit Association.

The sum of _____

Which Includes Accrued Interest Due Depositor And Cancels Certificate of Deposit on Face Side.

Signed _____ Depositor.

Signed _____ Pres. Ass'n.

Inventor
David Bird Wheeler

D. B. WHEELER.
BLANK FOR NEGOTIABLE BANKING INSTRUMENTS.
APPLICATION FILED AUG. 9, 1916.

1,225,543.

Patented May 8, 1917.
2 SHEETS—SHEET 2.

Fig. 3

---

WHEELER INDUSTRIAL BANKING AND CREDIT ASSOCIATION.

_%_     LOAN INVESTMENT BOND     _%_

For (_____)            _____            (_____),

_____

ONE YEAR FROM DATE

_____ will pay to _____

And charge to the account of the general fund of Wheeler Industrial Banking and Credit Association.

(_____) _____ with accrued interest at the rate of _%_ per annum.

Signed _____

---

APPLICATION FOR A

_%_

WHEELER INDUSTRIAL BANKING AND CREDIT ASSOCIATION

LOAN INVESTMENT BOND

For (_____)            _____            (_____)

_____

I, the undersigned, hereby make application for a _%_ Loan Investment Bond and place with the Wheeler Industrial Banking and Credit Association certificates of deposit to the amount of the bond applied for, made payable to the _____, as security for the said bond; the said certificates of deposit to remain in possession of the association until loan is made.
When loan is made, said certificates of deposit are to be surrendered to the _____, which will cancel same and issue in lieu thereof a Loan Investment Bond for the amount of certificates of deposit, plus the accrued interest thereon in even cents.
Payable by the _____ with accrued interest thereon, one year from date of issue.

Signed _____

*INVENTOR.*

*David Bird Wheeler*

UNITED STATES PATENT OFFICE.

DAVID BIRD WHEELER, OF WASHINGTON, DISTRICT OF COLUMBIA.

BLANK FOR NEGOTIABLE BANKING INSTRUMENTS.

1,225,543.      Specification of Letters Patent.    Patented May 8, 1917.

Application filed August 9, 1916. Serial No. 114,077.

*To all whom it may concern:*

Be it known that I, DAVID BIRD WHEELER, a citizen of the United States, residing at Washington, District of Columbia, have invented and discovered certain new and useful Improvements in Blanks for Negotiable Banking Instruments, of which the following is a specification.

As is well known, a very large proportion of business is carried on upon credit or upon borrowed capital. In order to establish a borrowing credit at banks and money loaning institutions, a person must maintain an account of a character that will justify the institution in extending credit. The systems now in practice result in borrowing credit being limited to a comparatively few people, those having sufficient resources and able to maintain a bank account of a character to justify extending credit to them. It is also well known that persons in moderate circumstances, working for modest salaries, and unable to accumulate resources or maintain a bank account of a character justifying credit under the present system, are frequently in need of credit and are deprived of the accommodation and benefits thereof, or compelled to pay exorbitant rates of interest for such accommodations, thereby seriously burdening themselves with obligations and extraordinary payments that might otherwise be avoided.

The object of my said invention is to devise a system of establishing a banking credit and provide means whereby a person, without capital or property, may obtain a loan, based upon his earning capacity, from any regular banking institution, without further expense than the payment of interest current in such commercial transactions.

The system which I have devised consists in merging into groups, or associations, a number of persons who will agree to deposit, in certain banking institutions, their earnings and savings, in a common or joint account, thus pooling their bank balances and establishing an account that, in itself, is entitled to borrowing bank credit available for the accommodation of members; further, in devising a plan whereby this credit may be equitably distributed and proportioned among the members, and the bank guaranteed against loss, through the pooling of the aggregate deposits and the establishment of a guarantee fund for the purpose. I further provide, as a feature of my system, a bank guaranteed investment which may be made available to members of the association who, instead of being borrowers, desire to become loaners or investors, thereby providing a safe and remunerative investment for small sums and encouraging thrifty people to become members of the association.

The invention consists, of course, not so much in the system which I have devised, as in the means for carrying it into practical effect, embodied largely in blank negotiable instruments, capable of being used to insure that the purposes of the system be fulfilled and its operation carried on in an economical, safe and expeditious manner. Before describing the blanks in detail, however, the operation of the system will be more fully outlined.

The association is formed by enlisting as members a number of persons interested either because of the advantages offered from a borrowing standpoint or from an investment standpoint. The membership of the association need not be limited—the larger the number, the more useful the association and the more efficient the operation of the plan. The members of the association all agree to deposit their funds in a certain banking institution, or in any one of a certain number of designated banks (when the association is of sufficient size to justify accounts in several banks), to the credit of the association, or joint, account. The bank in which the deposit is made will issue a certificate of deposit, hereinafter described, negotiable or subject to withdrawal, on the joint signature of the depositor and a designated officer of the association, together with accrued interest. A certain per cent. of the account, to be agreed upon between the association and the bank, will be set aside and held to the credit of the association as a fund to guarantee the bank against loss on loans which borrowers may ultimately fail to liquidate. In such an association, and under the conditions prevailing, such a fund would be a comparatively small per cent.; under present banking rules and regulations, not to exceed from 5 to 10 per cent.

Loans will be made to members of the association by the bank after application and on notes indorsed by the association and bearing interest at the rate current for regular bank loans at the time, the notes being payable to the association in monthly instalments and to be paid at maturity to the bank by the association from its general fund. The loans to members of the association are not only secured by the association account and the indorsement of the association itself, but, as above stated, by a special reserve fund which may be known as the association guarantee loan fund, created by the depositors, through the association, authorizing the bank to set aside an agreed per cent. from the deposits of each member. When the funds in the association account are not sufficient to take care of any defaulting loans, and after the bank has given notice to the association, the bank may then pay such defaulting loans from this association guarantee loan fund without further authorization, and the association thereby takes care of such defaulting loans, protecting its credit and keeping unimpaired its outstanding certificates of deposit. The guarantee loan fund provides for a pro rata apportionment of the defaulting loans among the members, in case the accumulations to the credit of the association in the association bank account (to be hereinafter more fully explained), are not sufficient.

I will now proceed to describe the blank forms of negotiable instruments which I have provided for carrying my plan into operation. These blank forms are illustrated in the accompanying drawings, which are made a part hereof, and in which Figure 1 illustrates the face of a blank certificate of deposit, with stub; Fig. 2 the reverse side or back thereof; and Fig. 3 the face of a blank loan investment bond; these blank instruments being the chief means of enabling my plan to be put into successful operation, and constituting the leading feature of my invention.

The certificate of deposit shown in Fig. 1 is numbered, and a corresponding number placed upon the stub. It bears the name of the association, such as "Wheeler Industrial Banking and Credit Association", or any other appropriate name that the members of the association may select. Beneath the name of the association it should preferably have the title of the instrument, such as "Certificate of deposit and withdrawal order". There should then be a blank date line, then a blank line for the name of the depositor, then a blank line for the amount deposited, and beneath the amount deposited will be printed the amount of interest, in even cents, for a specified time, at the rate of interest agreed upon. The certificate shown in Fig. 1 is computed at the rate of 3%, that is: "Bearing interest of 1¢ every 4 months on a $1 certificate. 1¢ every two months on a $2 certificate. 1¢ every month on a $4 certificate. And same rate of interest on every multiple thereof." Then follows the signature of the banking institution per the authorized official. Beneath this is printed: "To be credited to the account of the general fund of Wheeler Industrial Banking and Credit Association. Subject to withdrawal when order on reverse side is signed by the president of the association and depositor."

The stub of the certificate has a date line and a blank receipt for the certificate of deposit, with blanks for identifying the certificate, and a line for the signature of the designated official of the association.

The reverse side of the certificate, illustrated in Fig. 2, has at the top an interest table showing the monthly interest. The figures and amounts are used to illustrate the interest per month on a given amount, line B showing the interest for one month on a certificate of the face value indicated immediately beneath in line C. For example, a $4 certificate is the lowest amount that will earn 1¢ interest in one month at the rate of 3%, and this is therefore the minimum amount started with, running in multiples thereof up to a $100 certificate on which the interest for one month, at the rate of 3% per annum, is 25¢. By means of this table, the amount of interest due can be seen at a glance and is readily computable. Beneath the interest table is a date line, a line for the name of the banking institution, and then an order to pay to the certificate owner or any other person he may desire to name, and charge to the account of the association a sum which will be the face of the certificate with whatever interest is to be added. This order must be signed by the depositor and also by the authorized officer of the association, for example, the president of the association. Until this order is signed, both by the depositor and the proper association officer, the instrument is not negotiable; but after it is thus signed, it becomes a negotiable instrument which may be used as any bank check in commercial transactions for the amount stated in the order.

It is intended that these blank certificates of deposit and withdrawal orders shall be printed and bound in books similar to check books. Each member of the association will be given a book of blanks as required. In making a deposit, the depositor will fill out the certificate of deposit and present it, while still in his book, to the receiving teller of the bank, together with the amount deposited and an ordinary deposit slip. The receiving teller, in receiving a deposit, merely signs the certificate of deposit and places the amount to the credit of the association. The certificate of deposit therefore becomes, in effect, a certified check for the amount, bearing interest, however, at a specified rate; but it is not negotiable and cannot be used by the depositor, or anyone else, until after the withdrawal order on the back thereof has been properly signed by the depositor and also by the officer of the association. This makes it necessary for the depositor, before his certificate can be used, to present it to the officer of the association for signature. The officer of the association makes out the receipt on the stub of the certificate, removes the certificate and places it in the depositors' file of certificates in the association office. The depositor then has the receipt of the association for the deposit. When he needs a certificate for use, he ascertains from the stubs in his book the number of a certificate corresponding with the amount he needs and goes to the association and withdraws the same, at which time the officer of the association fills in the amount on the withdrawal order, including the interest for even months up to the time of withdrawal. The certificate is thereby canceled, and the withdrawal order then becomes a certified check, negotiable and usable in ordinary commercial transactions. It is paid by the bank when presented to the bank, and charged to the account of the association. The association's average balance, on which the bank will allow interest, varies, however, from the amount of outstanding certificates on which the association account is liable to the depositor for interest. The balance is always in favor of the association because of the fact that the periods between the date of the signature of the officer of the association on the certificate and the period when the certificate is presented to the bank for payment, run to the benefit of the association. Many certificates also will be withdrawn before the specified interest period, leaving an amount of forfeited interest by which the association will benefit.

By this plan, the depositor is required to deposit his certificates with the association. This enables the association to keep track of the deposits made by its members and their balances, and to correctly ascertain and compute assets, liabilities, credits, earnings, losses, etc., of the association.

It also places in the hands of the association, certificates of deposit of each depositor, which it can deposit with the bank to make up the pro rata share required of each depositor in the association guarantee loan fund.

When a member of the association desires a loan, application is made therefor and, on approval, a note is given to the bank, signed by the borrower and indorsed by the association, and bearing current rate of interest, on which the loan is made by the bank. Such form of loan, as will readily be seen, will be of unusually high grade, for the reason that it is not only backed by the organization, but because the association carries with the bank a guarantee loan fund of an amount required by approved banking rules and regulations. The association member is thus enabled to secure funds for temporary use at current interest rates, payable in easy monthly instalments to the association, and payable by the association to the bank at a specified period, thus providing a plan which is not only to the great advantage and convenience of the member of the association, but also to the bank in that it consolidates in a single account a large number of small accounts each of which, by itself, would be unprofitable and could be carried by the bank only at a loss caused by the time required for bookkeeping and attention. Such accounts, kept as individual accounts, would establish no borrowing credit for the depositor and thereby be of no value to the depositor or to the bank. By my improved plan of pooling the accounts through the medium of the association, the accounts become available not only for the benefit of the members of the association, but also result in a banking account which any banking institution will welcome and appreciate.

It will be understood, of course, that in lieu of an outside association, a pool or group of depositors may be formed by any banking institution and managed by an officer to be selected by the members of the pool or otherwise, thereby securing the same advantages, and in describing my plan, it will be understood that where I have used the term "association," I mean any pool or group of depositors associated together in a single bank account, whereby the advantages of establishing borrowing credit and security for the bank are attained.

In Fig. 3, I have illustrated an interest bearing loan investment bond, designed especially for the use of the members of the association who wish to place their savings on an investment basis and secure the advantage of larger rates of interest than allowed on the certificate of deposit. It is well known that savings banks, trust companies, and such institutions as encourage savings accounts, do not, as a rule, issue certificates of deposit bearing the higher rates of interest allowed on time deposits in denominations of less than $100. This results in limiting the availability of such certificates of deposit to a comparatively few people, because it is only a comparatively few of all depositors who have as much as $100 available for investment for a specified length of time at any one period. It frequently happens, however, that a person in modest circumstances, or drawing a modest salary, would like to put $20, or $30 or $50, or some other part of $100, in an investment bearing a higher rate of interest for a specified time. The purpose of my plan is to take care of this class of investors. When a member of the association desires to invest in an investment bearing, for example, interest at 5%, his application is filed and the amount he desires to so invest noted. Other members of the association, as they make like applications, have their applications filed and the amounts which they desire to invest noted. Another member of the association, desiring to borrow, for example $100, files his application, when the amount of the loan desired is noted. The loan is made by the bank at the rate, for example, of 6% to the borrower. The bank then issues to each applicant an association loan investment bond of $20, $30 or $50 to equal the amount of the loan. The bond, bearing interest at 5%, matures at the time the loan matures. The bank thus makes 1% on the transaction, while the loan has been carried by the members of the association who receive 5%. In this way, the members of the association who desire to save and have their funds accumulate as rapidly as possible, are enabled to get a larger rate of interest on their savings, and fractional amounts of $100 are made available for such investments.

The form of the loan investment bond, as shown in Fig. 3, is simple and need not be particularly described. The application for investment in such a bond is shown on the lower half of the bond, and is also simple and need not be further described. It is understood, of course, that the member applying for an investment bond deposits with the association certificates of deposit, or acceptable collateral, to the amount which he desires to invest in such a bond, when application is filed.

By this plan, members are enabled to accumulate interest on their idle funds more rapidly than by the use of the certificate of deposit bearing the lower rate of interest, while the bank is able to make a profit of 1% on the loan as a remuneration for its small trouble in issuing the bond and making the loan. The plan thus makes for the profit of both parties to the transaction, as well as provides an absolutely safe investment on the one hand, and a perfect security for the loan on the other.

Summarizing the plan and its operation:

The plan does away with the necessity of keeping numerous small individual accounts by the bank with the expense and bother incident thereto, which, as is well known, make such accounts, as a rule, unprofitable to banking institutions. It substitutes for these numerous small, unprofitable accounts, a single large account of a profitable character, which carries with it a borrowing credit, and, in connection with the guarantee loan fund, insures safety in making loans to members whereby said members, otherwise unable to command borrowing credit, are given opportunity to obtain needed loans at current interest rates and thus avoid the burden and hardships so frequently resulting from being forced to borrow at exorbitant and usurious rates.

As an example of the operation of the plan of pooling bank balances under this system, let us assume that a person, a member of such an association, has an income of $60 per month. This sum is deposited in the joint account. The living expenses of the person require that he use the money before the end of the month, estimating these expenses at $2 per day. Notwithstanding this, his average bank balance could be computed at $33. One thousand bank depositors in the same account would have a joint average bank balance of $33,000. Under the usual banking rules and regulations, this would entitle the account to a borrowing credit of $26,400. By this means, the living expenses of these thousand wage earners, thus pooled and associated, would be capitalized into a commercial bank credit for borrowing purposes sufficient to be of vast service to the members.

It will be understood that a standard certificate of deposit is established with the lowest denomination on which the monthly interest is expressible in even cents. Certificates of larger denominations are provided by taking numbers which are multiples of the standard certificate. Certificates of smaller denominations are provided by taking numbers which are fractions thereof, on which the interest is expressible in even cents, on interest periods which are parts of the year. For the purpose of providing for sums for which no certificate of deposit is provided, of which the denomination would express the desired sum, two or more certificates of deposit, the total of which will equal the desired amount, are taken. For example, when a certificate is to be made out for $139 at the rate of 3% per annum, the depositor would be given a certificate for $136, one for $2, and one for $1, making a total of $139; and each of the certificates made out with the interest computed in even cents.

Loans made against the joint account impair the value of every certificate of deposit issued by the bank in just the proportion to the loans made against the account. This makes the credit value of the account subject to fluctuation and makes necessary a means to keep the association advised of the exact conditions respecting these features of the account at all times. The association must, therefore, have an account with each depositor, which is accomplished by simply filing the certificates of deposit deposited with the association, thus supplying an account equal to a card ledger system, and enables the association to segregate and hold a sufficient number of certificates of deposit apart from the general fund to maintain the guarantee loan fund which preserves the parity of the value of the certificates presented for payment. The expenses of the association are amply provided for and maintained out of the earnings of the association account in excess of the earnings allotted to the members as heretofore explained.

It will be understood, of course, that the blanks illustrated in the accompanying drawings and forming the subject matter of this invention, may have printed on them the names of the banking institutions, as well as the name of the city and State where located, in addition to the matter shown in the drawings, all without materially altering the certificate or departing from the spirit of the invention.

Having thus fully described my said invention, what I claim as new and desire to secure by Letters Patent, is:

1. As a feature of a banking system, a blank form for a negotiable instrument containing data with blanks to be filled in to make a certificate of deposit; directions that the amount deposited for which the certificate is issued be credited to a pooled account; and an order for the withdrawal of the deposit good only when signed by the depositor and a person authorized to act for the pooled account, substantially as set forth.

2. A banking system blank for a negotiable instrument containing data with blanks to be filled in to make a certificate of deposit; directions that the amount deposited be credited to a pooled account; an order for the withdrawal of the deposit good only when signed by the depositor and a person authorized to act for the pooled account; and a stub receipt having a form on which the person authorized to act for the pooled account may receipt to the depositor for the certificate of deposit, substantially as set forth.

3. A blank form for a negotiable instrument for use in a pooled banking account containing data with blanks to be filled in to make a certificate of deposit to the individual members of the pool; directions that the amount deposited be credited to the pooled account; an order for the withdrawal of the deposit good only when signed by the depositor and a person authorized to act for the pooled account; a stub provided with a blank form for a receipt to be given by the person acting for the pooled account to the owner of the certificate of deposit; and a statement thereon of the interest at a given rate expressed in even cents for specified periods, substantially as set forth.

4. In a banking system, a blank form for use in pooled accounts containing data with blanks to be filled in to make a certificate of deposit; information expressing the interest at a given rate in even cents for specified periods; authority to credit the deposit to the pooled account; and an order for the withdrawal of the deposit plus earned interest good only when signed by the depositor and one authorized to act for the pooled account, substantially as set forth.

5. In a banking system for the accommodation of pooled accounts, blanks therefor including a certificate of deposit for each individual showing the amount deposited; directions to credit the amount to the pooled account; an order for withdrawal; and a receipt made for the certificate of deposit to be given by a person representing the pooled account, substantially as set forth.

6. In a banking system for establishing industrial credit, a negotiable instrument representing amounts deposited by individuals in a pooled account; and another negotiable instrument representing pooled investments in loans to members of the pool and containing a provision for the cancellation of the investment by the payment of the loan, substantially as set forth.

In witness whereof, I have hereunto set my hand and seal at Washington, District of Columbia, this second day of August, A. D. nineteen hundred and sixteen.

DAVID BIRD WHEELER. [L. S.]

Witnesses:
E. W. BRADFORD,
CHAS. E. RIORDAN.